United States Patent [19]

Nakase et al.

[11] Patent Number: 5,558,549
[45] Date of Patent: Sep. 24, 1996

[54] FOUR CYCLE ENGINE FOR WATERCRAFT

[75] Inventors: Ryoichi Nakase; Masayoshi Nanami, both of Hamamatsu, Japan

[73] Assignee: Sanshin Kogyo Kabushiki Kaisha, Hamamatsu, Japan

[21] Appl. No.: 394,457

[22] Filed: Feb. 27, 1995

[30]    Foreign Application Priority Data

Feb. 28, 1994 [JP] Japan .................................. 6-030490

[51] Int. Cl.⁶ .................................................... B63H 21/32
[52] U.S. Cl. ............................................. 440/88; 114/270
[58] Field of Search ............................. 114/270; 440/38, 440/47, 88, 89

[56]            References Cited

U.S. PATENT DOCUMENTS

5,037,340   8/1991   Shibata ...................................... 440/88
5,237,950   8/1993   Abe et al. ................................. 114/363

*Primary Examiner*—Stephen Avila
*Attorney, Agent, or Firm*—Knobbe, Martens, Olson & Bear

[57]            ABSTRACT

A small, personal watercraft powered by a four cycle internal combustion engine. The engine is provided with a dry sump lubrication system for permitting the engine to be mounted low in the hull and this dry sump lubrication system includes a lubricant tank mounted within the hull separately from, but spaced closely to, the engine. Induction and exhaust systems are provided for the engine which include position responsive valves that close when the watercraft is inverted to preclude water from entering the combustion chamber through either the intake or the exhaust system. The induction system also includes an air inlet device that has its own position responsive check valve and which provides a centrifugal separator for separating water from the air inducted into the engine.

33 Claims, 8 Drawing Sheets

FOUR CYCLE ENGINE FOR WATERCRAFT

BACKGROUND OF THE INVENTION

This invention relates to a watercraft and more particularly to an improved four cycle engine for the watercraft and auxiliaries for such engines.

There is a very popular type of small watercraft that is designated as a "personal" watercraft. This type of watercraft is quite compact in nature and frequently accommodates the operator and/or passengers seated in a straddle fashion. Where more than one occupant is present, the occupants frequently ride in a tandem fashion.

It has been generally the practice to employ as prime movers for such watercraft two-cycle engines. Two-cycle engines have a number of advantages, the prime of which is the relatively compact construction of such engines. In addition, with crankcase compression two-cycle engines, the induction and exhaust systems can be positioned relatively low on the engine and thus the engine can be quite compact in configuration.

This compact configuration is particularly important when the engine is disposed so that it is positioned beneath the seat of the watercraft. Using the tandem straddle-type seat arrangement, the seat is relatively narrow and tapers outwardly in a downward direction. Hence, two-cycle engines are particularly adapted for positioning beneath such seats.

There are, however, certain reasons why four-cycle engines may be more advantageous for use in such watercraft. Four-cycle engines may, in some instances, be more environmentally friendly and thus they are being considered for this type of application.

There are, however, certain difficulties with using four-cycle engines in watercraft and particularly small personal-type watercraft. The first of these is that the four-cycle engine is generally more complex and larger for a given output than a two-cycle engine. Since this type of watercraft is quite small, the positioning of the engine and all of its auxiliaries in a small watercraft can present some difficulties.

Also, because of the fact that four-cycle engines are lubricated by a lubricant source with the lubricant being recycled, the engine tends to become higher than a two-cycle engine, particularly if the crankcase is used as the reservoir for the lubricant. This can place the axis of rotation of the engine output shaft at a high enough level that a transmission or offset drive must be employed for driving the propulsion device for the watercraft.

On the other hand, if a dry sump lubricating system is employed, the engine can be mounted lower, but then there is a problem in the location of the dry sump tank for the engine, again due to the compact nature of the watercraft. In addition, because these watercraft are very sporting in their nature, the lubricating tank should be quite close to the engine so that if the watercraft becomes partially or totally capsized, the lubricant can return to its normal level in both the engine and in the dry sump tank once the watercraft is again righted.

It is, therefore, a principal object of this invention to provide an improved watercraft having a four-cycle internal combustion engine employing a dry sump arrangement.

It is a further object of this invention to provide a dry sump lubricating system for a four-cycle engine for a watercraft when the lubricant tank is mounted close to the engine.

Because of the sporting nature of this type of watercraft, as aforenoted, the watercraft frequently can become partially or fully capsized. This means that water is likely to enter into the engine compartment. If this water is allowed to come into contact with the air inlet system for the engine, the water can in fact enter the cylinders of the engine through the induction system. This problem may be further aggravated when the watercraft is again righted. Any water which may enter into the induction system can then flow by gravity into the engine through the induction system when the watercraft is again righted.

In addition, it is frequently the practice to discharge the exhaust gases from the engine, either into the body of water in which the watercraft is operating below the water level, or at a point close to the water level. Thus, water can enter the exhaust system under extreme conditions.

It has been the practice to employ water trap devices in the exhaust system which will permit the free flow of exhaust gases to the discharge, but which will trap water that may tend to enter the exhaust system if the watercraft is stationary and/or becomes partially or totally capsized. These water trap devices are, for the most part, quite effective.

However, with most watercraft engine exhaust systems, coolant from the engine is discharged into the exhaust system at some point upstream of the discharge end of the exhaust system. This water itself can escape the water trap device and may flow into the engine through the exhaust system when the watercraft is partially or totally capsized and subsequently righted.

It is, therefore, a still further object of this invention to provide an improved engine for a watercraft having an induction and an exhaust system, and wherein water is precluded from entering the engine through one or both of the systems.

It is a further object of this invention to provide an improved valving arrangement for a four cycle internal combustion engine designed for watercraft use that is positioned close to the engine cylinders and which will preclude water from entering the cylinders through the intake and/or exhaust systems.

It should be readily apparent from the foregoing description that watercraft of the type disclosed operate with the engine exposed to a fairly substantial amount of water. This water can be drawn into the engine through the induction system during the time when the engine is running and/or if the engine is not running and the watercraft becomes partially or totally capsized and is again righted.

It is, therefore a still further object of this invention to provide an improved air inlet device for a watercraft engine that will preclude the likelihood of water entering the engine through the induction system.

It is a further object of this invention to provide an improved air inlet device for a watercraft engine wherein water, which may be mixed with the air inducted, can be separated in the inlet device.

SUMMARY OF THE INVENTION

A watercraft embodying a first feature of this invention has a hull which defines an engine compartment and which hull carries a propulsion unit for propelling the hull through a body of water. A four-cycle internal combustion engine is positioned within the hull and is comprised of a cylinder block having at least one cylinder bore receiving a piston. A cylinder head is affixed to the cylinder block and defines with the cylinder bore and the piston a combustion chamber. A crankcase is affixed to the cylinder block and defines at least in part a crankcase chamber in which a crankshaft driven by the piston is journaled. A lubricating system for the engine is also provided which is comprised of a lubricating tank fixed within the engine compartment in proximity to, but spaced from, the crankcase chamber. Lubricant pump means circulate lubricant from the lubricant tank to the engine and return the lubricant from the engine to the lubricant tank. A transmission is provided for driving the propulsion unit from the crankshaft.

Another feature of the invention is adapted to be embodied in a watercraft having a hull in which a four cycle internal combustion engine is positioned for driving a propulsion device of the watercraft. The engine includes a cylinder head having an intake passage that extends from an outer surface of the cylinder head to a combustion chamber formed therein, and an exhaust passage that extends from the combustion chamber through the cylinder head to an external surface for discharging exhaust gases from the combustion chamber. Induction and exhaust systems, respectively, supply an intake charge to the engine through the intake passage and discharge the exhaust gases to the atmosphere. Valve means are provided in at least one of the cylinder head passages contiguous to the cylinder head outer surface for closing the passage and precluding the flow of water into the engine through the passage.

Other features of the invention are adapted to be embodied in the induction system of an internal combustion engine positioned within a watercraft hull for driving a propulsion device of the hull. The engine has an induction system that includes an air inlet opening to which an air induction device is affixed. The air induction device is comprised of an outer housing having a discharge opening that is affixed in registry with the engine induction system air inlet opening. In addition, the outer housing defines an air inlet for drawing atmospheric air.

In accordance with a first of these features the atmospheric air inlet is provided with a valve that is automatically moveable to a closed position if the watercraft hull becomes displaced for precluding the entry of water into the engine through the induction system.

In accordance with another feature of this portion of the invention, the air inlet device outer housing defines a circular chamber that extends radially outwardly of the air inlet opening. The inlet is disposed relative to the circular chamber for generating a swirling centrifugal action to the air inducted for centrifugal removal of water particles from the air before they pass into the air inlet opening.

DETAILED DESCRIPTION OF THE PREFERRED EMBODIMENTS OF THE INVENTION

Figure 1:
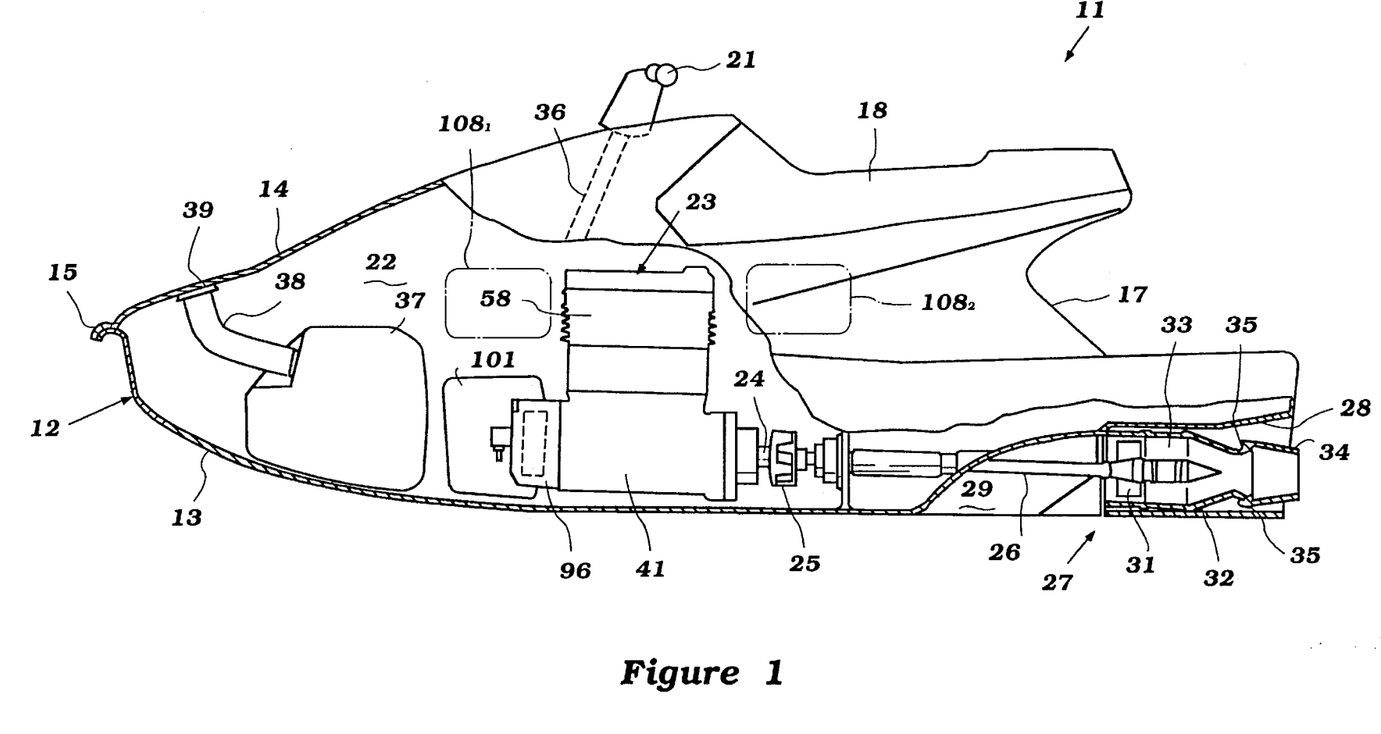
FIG. 1 is a side elevational view, with a portion broken away and with portions shown in section of a small watercraft constructed in accordance with a first embodiment of the invention.
Figure 2:
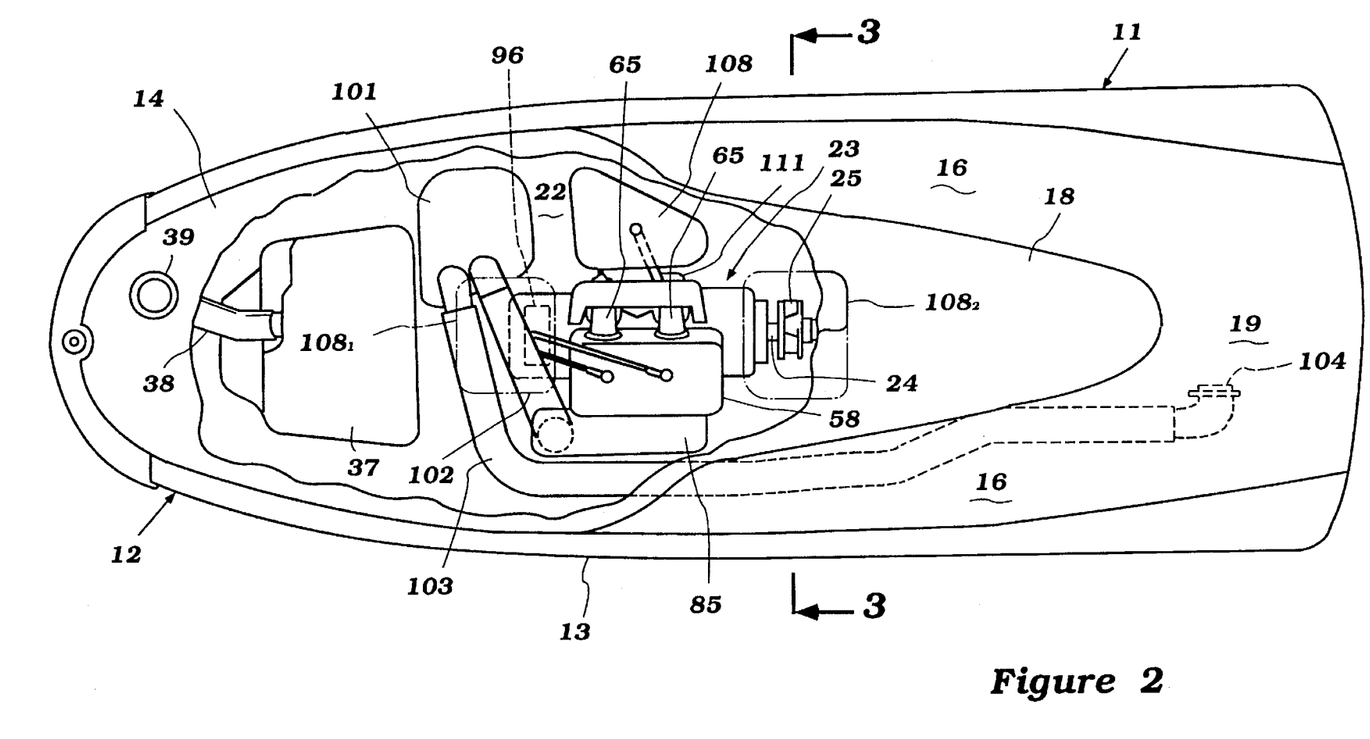
FIG. 2 is an enlarged top plan view of the watercraft with another portion broken away.

Referring in detail to the drawings and initially primarily to FIGS. 1 and 2, a personal watercraft constructed in accordance with an embodiment of the invention is identified generally by the reference numeral 11. Although the invention is described in conjunction with a personal watercraft, it will be readily apparent to those skilled in the art that the invention may be employed in a wide variety of other applications. However, and as has been previously noted, the invention has particular utility in conjunction with personal watercraft because of their compact nature.

Also, it should be understood that the configuration of the personal watercraft 11, which will be described, is typical of those in which the invention may be practiced. Again, the invention is capable of use with watercraft having other configurations. The invention, however, also has particular utility in conjunction with watercraft having seats of the type which will be described and those having seats where the rider or riders sit in straddle fashion, as will become apparent.

The watercraft 11 is comprised of a hull, indicated generally by the reference numeral 12 which is comprised of a lower hull portion 13 and an upper deck portion 14. The hull and deck portions 13 and 14 are formed from a suitable material such as a molded, fiberglass-reinforced resin or the like. The hull and deck portions 13 and 14 are secured to each other along mating edges which form a gunnel 15 in any known manner.

To the rear of the deck portion 14 there is provided a rider's area which is comprised of a pair of foot areas 16 disposed on opposite sides of a raised pedestal 17 which supports a seat cushion 18 on its upper side. In this particular seating configuration, a rider rides the watercraft 11 in a semi-standing position, much like a motorcycle. A passenger may be seated in tandem fashion behind a rider on the seat cushion 18 and/or standing on a rear deck area 19 formed to the rear of the pedestal 17 and which bridges the foot areas 16. As has been previously noted, this particular configuration is just typical of those in which the invention may be utilized. As may be seen best in FIG. 3, the raised area 17 has a generally curved configuration that tapers outwardly so that the riders on the seat cushion 18 can have a comfortable leg and seating position.

Positioned on the deck 14 forwardly of the seat cushion 18 is a handlebar assembly 21 for control of the watercraft 11. The handlebar assembly 21 is employed for steering the watercraft 11, in a manner which will be described and also for control of the throttle of the powering internal combustion engine. In addition, other controls such as kill switches, starter switches, etc., may be carried on the handlebar assembly 21.

The hull portion 13 and deck portion 14 form an engine compartment area, indicated generally by the reference numeral 22 which is disposed in part beneath the control handlebar assembly 21 and the forward portion of the seat cushion 18. The pedestal 17 also defines this engine compartment. An internal combustion engine, indicated generally by the reference numeral 23, is disposed in this engine compartment 22 and extends also beneath the handlebar assembly 21 and the forward portion of the seat cushion 18. This engine also lies within the pedestal 17 as should be readily apparent. The engine 23 has a construction as will be described in more detail later.

However, the engine includes an output shaft 24 which is journaled in a manner to be described and extends rearwardly to a coupling 25. The coupling 25 connects the output shaft 24 to an impeller shaft 26 of a jet propulsion unit, indicated generally by the reference numeral 27 and which provides the propulsion unit for the watercraft 11.

This jet propulsion unit 27 is mounted in a suitable manner in a tunnel 28 that is formed centrally in the underside of the rear part of the hull portion 13. The jet propulsion unit 27 and tunnel 28 form a downwardly facing water inlet opening 29 through which water is drawn by an impeller 31 that is affixed to the impeller shaft 26 and which is journaled within an outer housing 32 of the jet propulsion unit 27 by means including a nacelle formed at the center of a plurality of straightening vanes 33.

Water pumped by the impeller 31 is discharged rearwardly through a steering nozzle 34 that is journaled for steering movement about a vertically extending steering axis by the outer housing 32 on pivot pins 35. The steering nozzle 34 is coupled by means of a bowden wire actuator (not shown) or the like to a steering shaft 36 coupled to the handlebar assembly 21 for steering of the direction in which the water is discharged by the steering nozzle 34 and, accordingly, steering of the watercraft 11 in a manner as is known in this art.

Certain ancillaries for the engine 23 are also mounted in the engine compartment 22 and these include a forwardly positioned fuel tank 37 which is disposed generally on the longitudinal center line of the watercraft. The fuel tank 37 has a fill neck 38 to which a filler cap 39 is affixed. The fill neck 38 extends to the forward portion of the deck 14 and the filler cap 39 is externally positioned so that the tank 36 may be easily refilled.

The construction of the engine 23 will now be described by reference initially to FIGS. 1–3. In the illustrated embodiment, the engine 23 is comprised of an in-line, two-cylinder, twin overhead camshaft engine operating on a four-stroke principle. As should be readily apparent from the foregoing description, the invention has particular utility in adapting such four-stroke engines for use in small, personal watercraft like the watercraft 11.

The engine 23 is comprised of a crankcase assembly 41 which is mounted in the hull 12 and specifically on the hull under-portion 13 by means of elastic isolators 42 in a well known manner. The crankcase assembly 41 forms a crankcase chamber 43 in which the output shaft 24 is rotatably journaled in a manner to be described.

Figure 4:
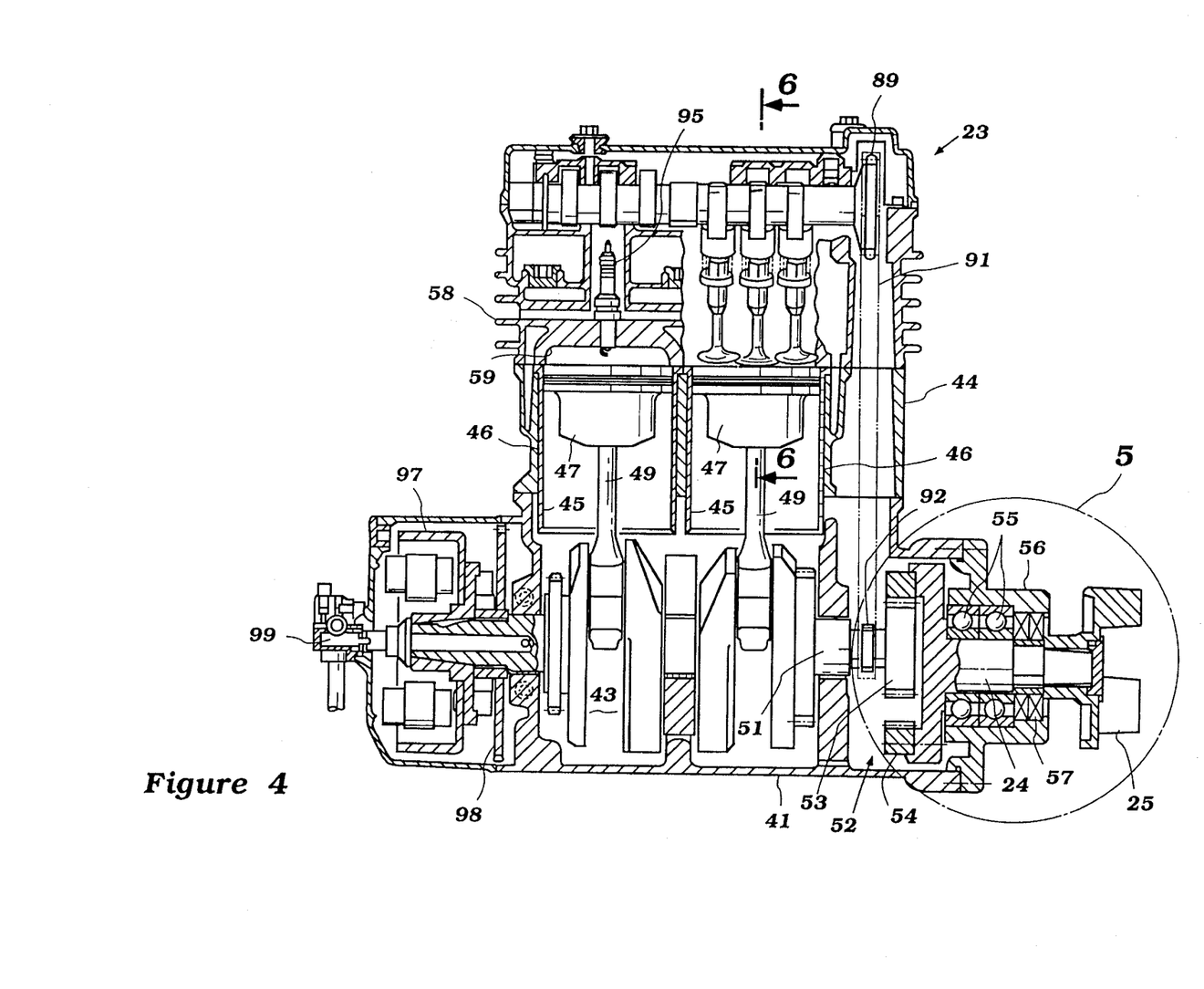
FIG. 4 is an enlarged longitudinal cross-sectional view taken through the cylinder bores of the engine.
Figure 5:
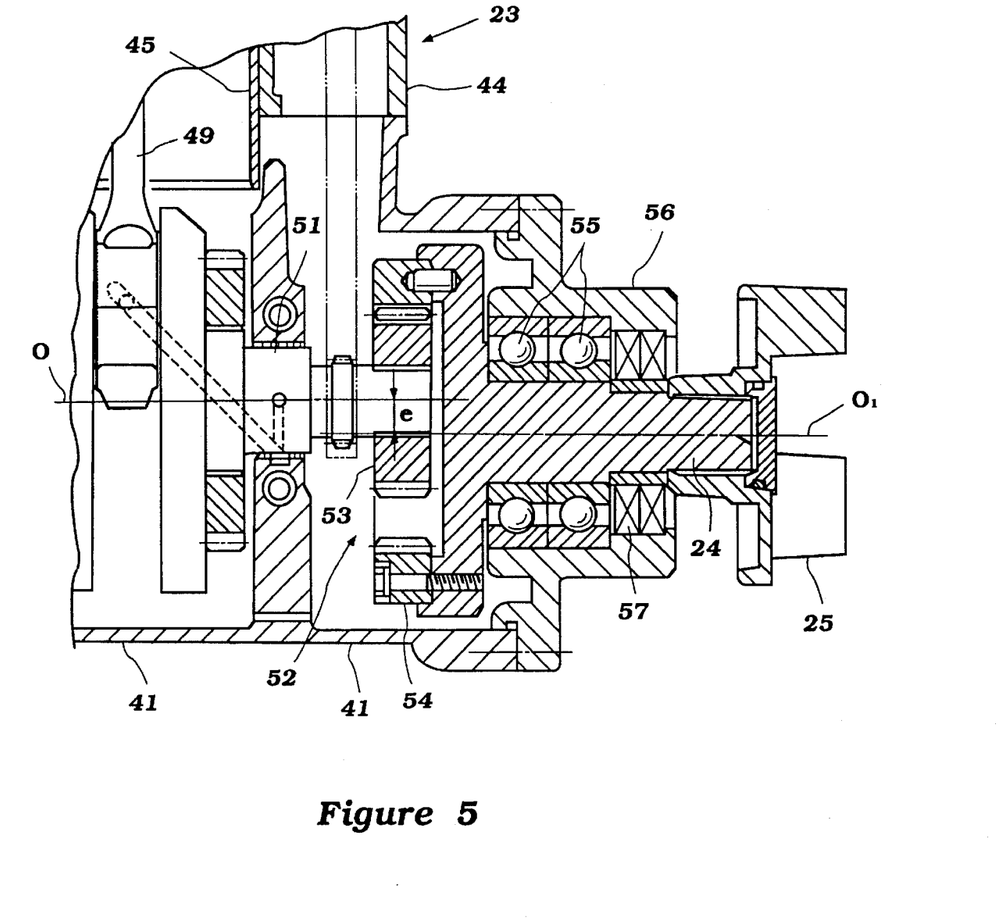
FIG. 5 is an enlarged view of the area encompassed by the circle 5 in FIG. 4 and which shows the output arrangement for the engine.
Figure 6:
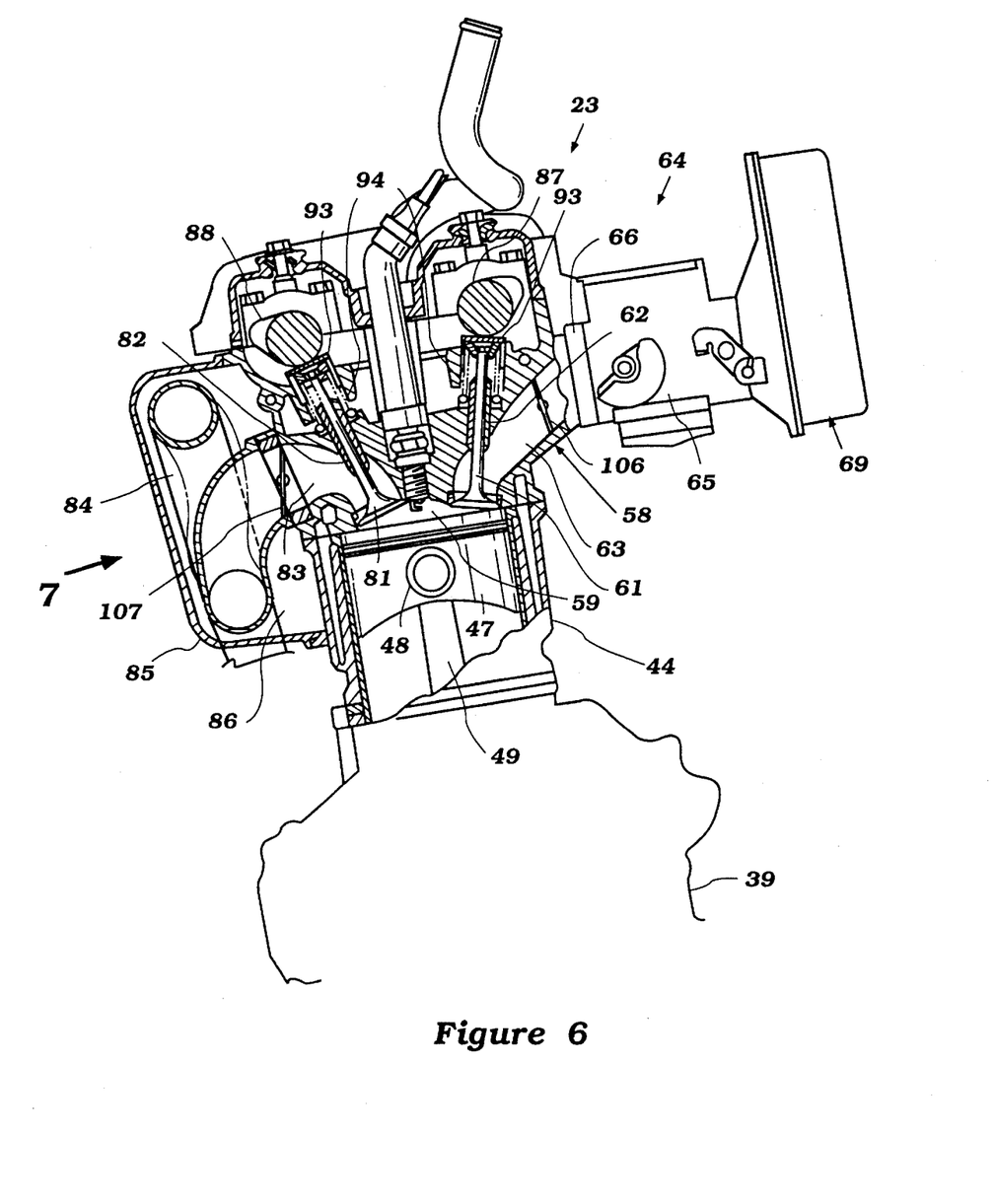
FIG. 6 is an enlarged rear elevational view of the engine, with a portion broken away and shown in sections.
Figure 7:
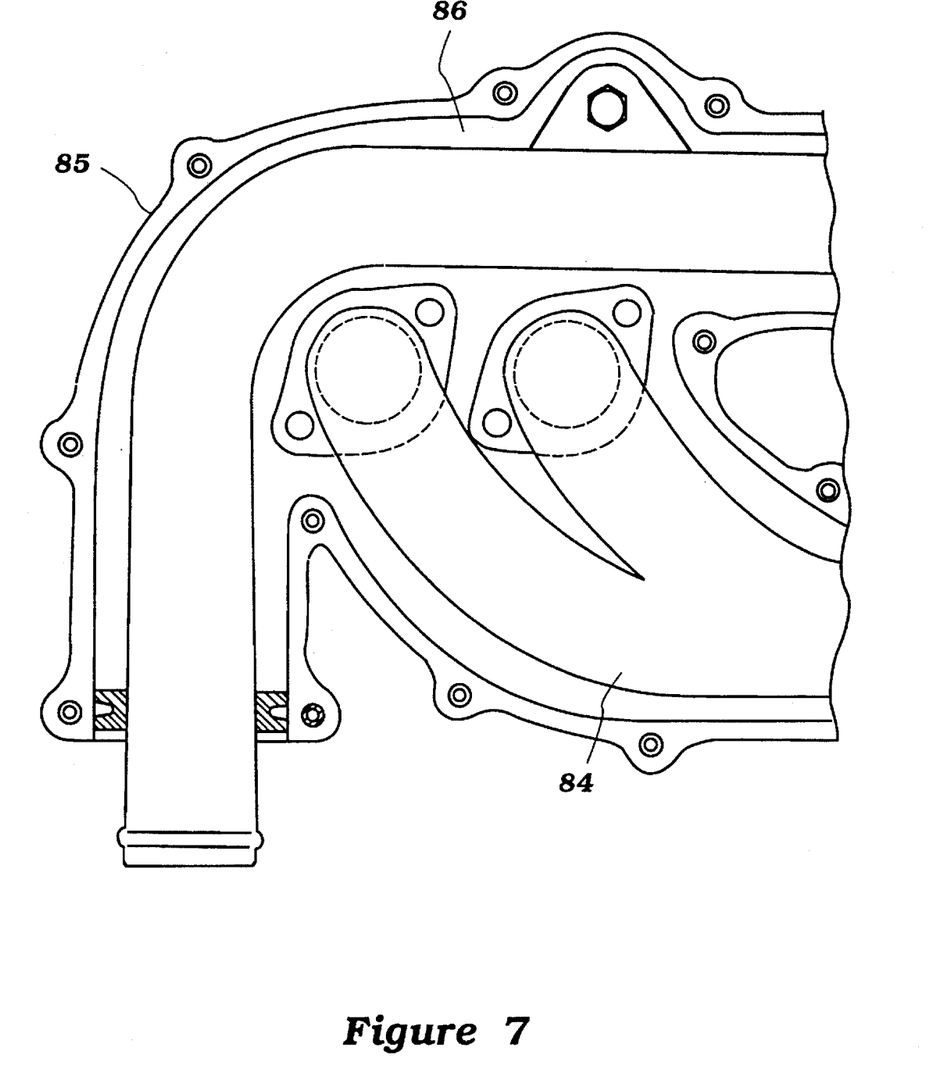
FIG. 7 is an enlarged view looking in the direction of the arrow 7 in FIG. 6 and with the manifold cover removed.

The engine 23 will now be described in still further detail by reference primarily to FIGS. 4–6, although certain of the components appear in other figures. A cylinder block 44 is affixed to the crankcase member 41 in a well known manner and extends upwardly from it. The cylinder block 44 forms a pair of in-line cylinder bores 45 which are, in the illustrated embodiment, formed by cast or pressed in liners 46. These cylinder bores 45 have their axes lying on a plane that is offset .at an acute angle to a vertical longitudinally extending plane V (FIG. 3). In the illustrated embodiment, the cylinder block 44 is canted to the left.

Pistons 47 are reciprocally supported in the cylinder bores 45. The pistons 47 are connected by means of piston pins 48 to the small ends of connecting rods 49. The connecting rods 49 have their big ends connected to the throws of a crankshaft 51 that is journaled for rotation in the crankcase chamber 43 by a suitable bearing arrangement. The axis of rotation of all of the crankcase 51 is indicated at O in FIG. 3 and lies on the longitudinal center plane V of the watercraft hull 12.

In order to maintain a low center of gravity for the crankshaft 51, the crankcase chamber 43 is of the dry sump type. However, the axis of rotation O is disposed slightly vertically above the axis of rotation of the impeller shaft 26. Therefore, a transmission arrangement, indicated generally by the reference numeral 52, and shown in most detail in FIG. 5, is provided so as to couple the crankshaft 51 to the output shaft 24.

This transmission 52 comprises a pinion gear 53 that is affixed to the rear end of the crankshaft 51 in a known manner. This gear also rotates about the axis O and is enmeshed with an internal ring gear 54 that is fixed to the output shaft 24. This gear arrangement permits, if desired, a reduction in speed between the crankshaft 51 and the impeller shaft 26, which is useful to permit the engine 23 to run at a high speed and to obtain high power for a small displacement while avoiding cavitation in the jet propulsion unit 27. In addition, the axis of rotation O of the crankshaft is offset from the axis of rotation $O_1$ of the output shaft 24 with the latter being lower in the hull. This offset is indicated by the dimension e in FIG. 5.

The output shaft 24 is journaled by a pair of spaced bearings 55 carried by a carrier plate 56 which forms an end closure for the crankcase member 41. Oil seals 57 are disposed outwardly of the bearings 55.

A cylinder head assembly, indicated generally by the reference numeral 58, is affixed to a cylinder block 44 in any known manner. The cylinder head assembly 58 is provided with individual recesses 59 that cooperate with the cylinder bores 45 and the heads of the pistons 47 to form the combustion chambers of the engine.

Formed on one side of the cylinder head assembly 58 is an induction system that is comprised of three intake valves 61 that are slidably supported in valve guides 62 in the cylinder head assembly 58. These intake valves 61 are formed at the termination of intake passages 63 that extend from an outer face on one side of the cylinder head assembly 58 to the combustion chambers.

An induction system, indicated generally by the reference numeral 64, supplies a fuel air charge to these combustion chambers. In the illustrated embodiment, the intake passages 63 are of the siamese type and the induction system 64 includes a pair of carburetors 65, each having a flange portion 66 that is affixed to the intake side of the cylinder head 58 in a known manner for supplying a fuel air charge to the intake passages 63.

Figure 8:
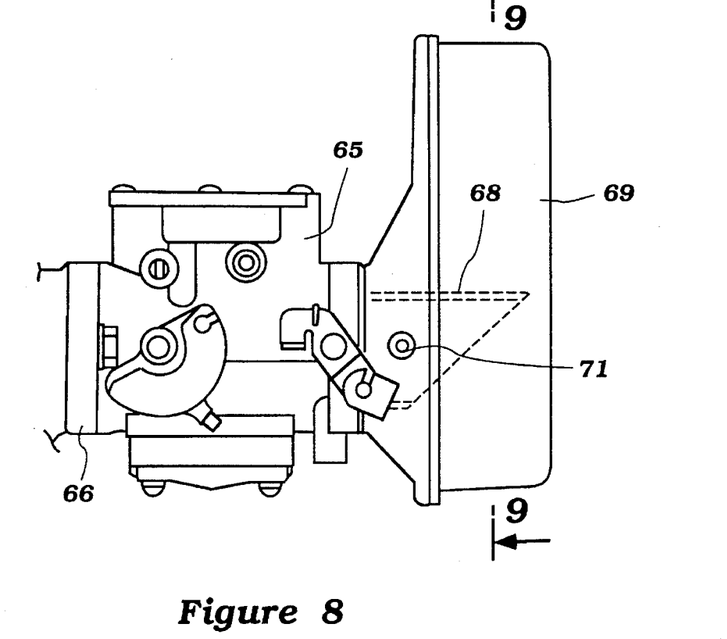
FIG. 8 is an enlarged side elevational view of a portion of the induction system and looking in the same direction as FIG. 3.
Figure 9:
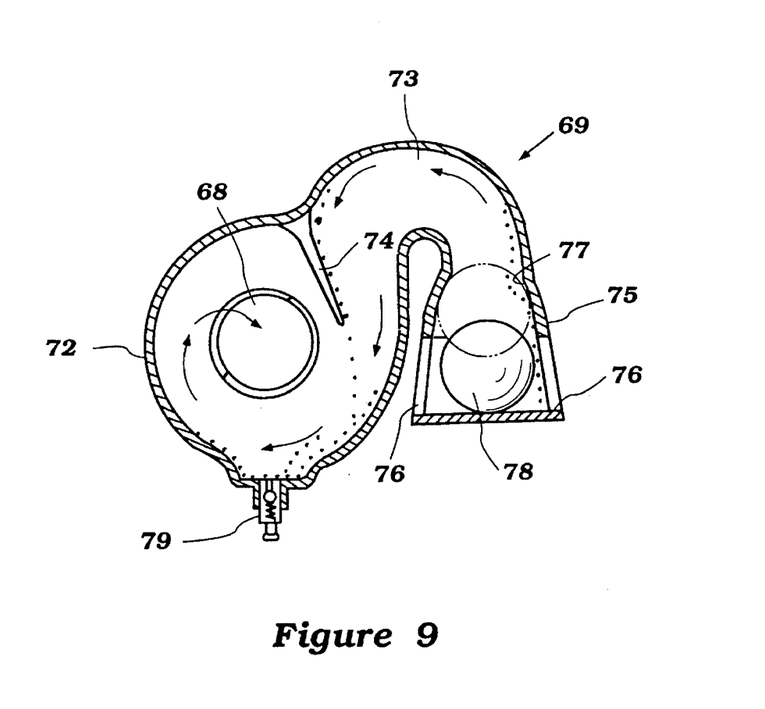
FIG. 9 is a cross-sectional view taken along the line 9—9 of FIG. 8.

Each carburetor 65 has an air inlet 68 to which an air inlet, water separator device, indicated generally by the reference numeral 69, is affixed by means of threaded fasteners 71. The air inlet devices 69, as shown best in FIGS. 8 and 9, are comprised of outer housings that have a cylindrical portion 72 that surrounds the carburetor air inlet 68. A U-shaped section 73 extends from this cylindrical position adjacent a baffle 74 to an air admission member 75. The air admission member 75 has a plurality of circumferentially spaced openings 76 that are formed adjacent a seating surface 77. A ball-type valve 78 is captured in the air admission member 75 and, in the event the watercraft becomes inverted, will engage the seating surface 77 as shown in phantom lines in FIG. 9 so as to preclude water from entering into the engine through its induction system.

In addition, any water vapor that may be drawn into the system will be separated by centrifugal action caused by the curved shape of the section 73 which will cause the water to impinge upon the sides of the air inlet device 69 and condense. In addition, impingement on the baffle 74 will aid in this separation. Finally, the air flow is such that it will flow in a circular direction around the portion 72 so that centrifugal separation will further separate the water from the inducted air. A drain valve 79 is provided at the lower portion of the air inlet device circular portion 72 so that the water can drain either by gravity when the engine is not running or maybe drain manually if desired.

On the side of the cylinder head 58 opposite the intake valves 61, there are provided a pair of exhaust valves 81 (FIG. 6) which are slidably supported in the cylinder head 58 on valve guides 82. The exhaust valves 81 control the flow of exhaust gases through exhaust passages 83 formed in the cylinder head 58 on the exhaust side thereof. These exhaust gases are delivered to an exhaust manifold 84 that is contained within a cover plate 85 which, in turn, forms a water jacket 86 around the exhaust manifold 84. Water is delivered to the cooling jacket 86 in a suitable manner and the remainder of the engine 23 is also water cooled. This water is drawn in a suitable manner from a body of water in which the watercraft is operated.

The intake valves 61 and exhaust valves 81 are operated by respective intake and exhaust camshafts 87 and 88 that are journaled in a suitable manner in the cylinder head assembly 58. These camshafts have affixed to one end thereof sprockets 89 (FIG. 4) around which a timing chain 91 is entrained. The timing chain 91 is driven from the crankshaft 51 by means of a sprocket 92 that is either fixed to the crankshaft or formed integrally on it adjacent the gear 53. As is known in this art, the camshafts 87 and 88 are driven at one-half crankshaft speed.

The camshafts 87 and 88 operate the valve 61 and 81 through thimble tappets 93 that are slidably supported in the cylinder head 58. Coil compression springs 94 normally hold the valves 61 and 81 in their closed positions.

Spark plugs, indicated generally by the reference numeral 95, are mounted in the cylinder head assembly 58 generally centrally in the combustion chamber recesses 59. These spark plugs 95 are fired by an ignition system which is shown schematically in FIG. 2 and identified generally by the reference numeral 96. The ignition system 96 is powered from a magneto generator, indicated generally by the reference numeral 97, which is mounted on the front end of the crankshaft 51 and which includes a flywheel. In addition, a starter mechanism may be provided which is associated with a starter gear 98 fixed to the flywheel magneto 97 for electric starting of the engine 23.

A tachometer drive 99 is also provided at the front of the engine and is driven off the central extending portion of the crankshaft 51 so as to provide an indication of engine speed.

Returning now to a description of the components which are mounted in the hull 12, and specifically to FIGS. 1 and 2, the exhaust gases from the exhaust manifold 84 are delivered to a water trap device, indicated generally by the reference numeral 101 which is disposed on the side of the engine opposite the exhaust system and on the intake side. This water trap device 101 is disposed forwardly of the engine and rearwardly of the fuel tank 32.

An exhaust conduit 102 extends from an outlet portion 103 of the exhaust manifold 84 and delivers the exhaust gases to the water trap device 101. The water trap device 101 may be provided with internal bafflings so as to provide silencing for the exhaust gases and also to assist in insuring that water cannot flow to the engine through the exhaust system.

An exhaust pipe 103 extends from the water trap device 101 back across the front of the engine 23 and then along the side of the engine to the rear of the hull 12. The exhaust pipe 103 has its rear discharge end portion extending along and closely adjacent to tunnel 28. Its discharge end 104 discharges directly into the tunnel. This discharge also places the end 104 close to the longitudinal center line of the watercraft and hence reduces the likelihood that water may flow to the engine through the exhaust system if the watercraft is partially capsized on one side or the other.

That is, if the watercraft is capsized on one side to the position shown in FIG. 2, water would have to flow uphill through the water trap device 101 before it could pass to the engine through the exhaust system. Hence, good water protection is provided.

Further protection against water entering the engine in the event the watercraft becomes inverted or even submerged is provided by an intake water control valve 106 that is positioned in the cylinder head intake passage 53 and which is operated either by gravity or by some other automatic means when the watercraft becomes inverted so as to preclude water from flowing into the combustion chamber through the intake passages 63 even at times when the engine stops with the intake valve 61 open.

A similar exhaust water control valve 107 is placed at each of the discharge ends of the cylinder head exhaust passages 83 and is operated in a similar manner.

Figure 3:
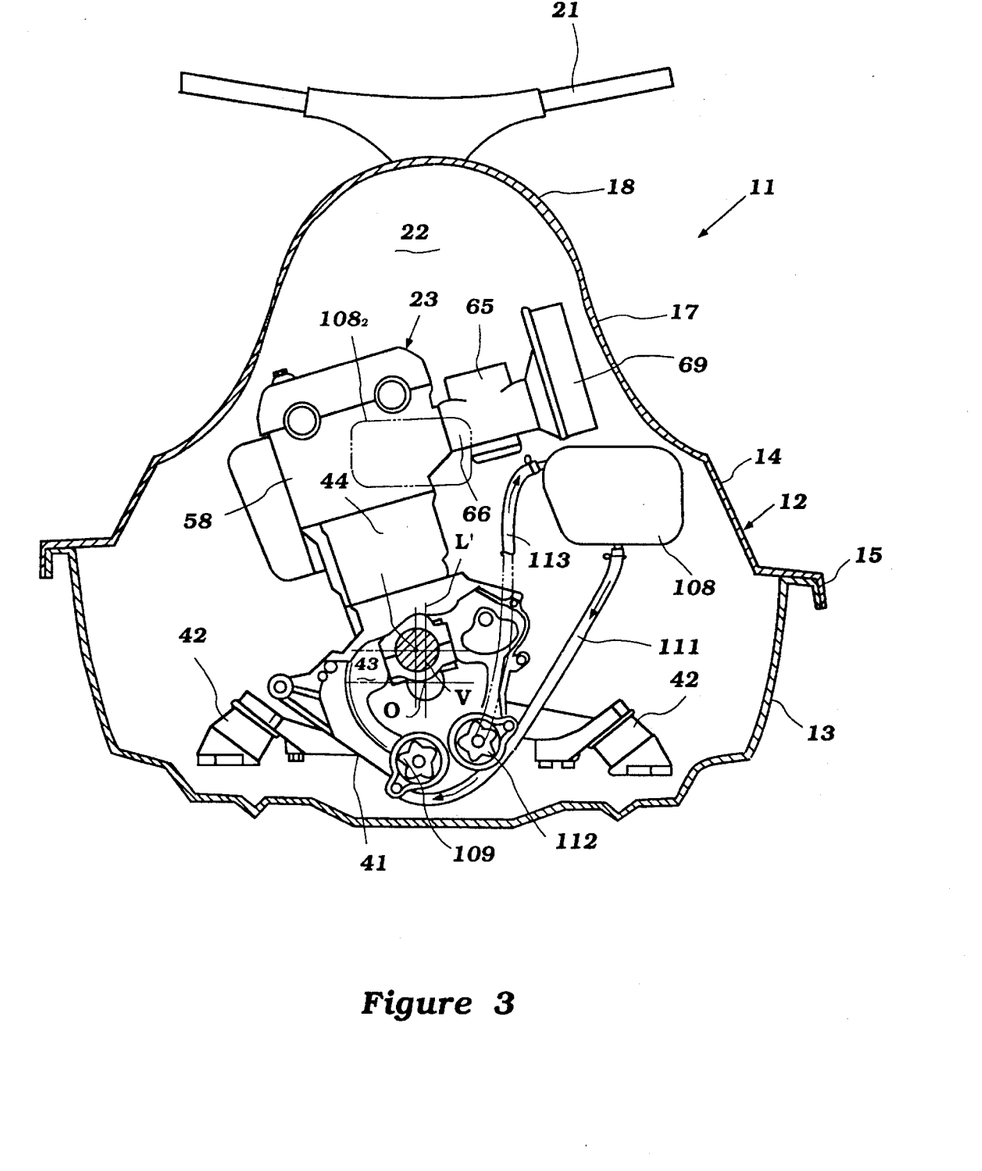
FIG. 3 is an enlarged cross-sectional view taken along the line 3—3 of FIG. 2.

It should be apparent, particularly from FIG. 3, that the canting of the engine 23 and specifically the cylinder block 44 to an acute angle from a vertically extending plane, specifically the longitudinal center plane V of the watercraft hull 12, it is possible to accommodate the induction system and exhaust system beneath the pedestal area 17. It should be readily apparent from FIG. 3 that this would not be possible if the engine 23 were positioned so that the cylinder bore axes extended vertically.

In order to further accommodate the mounting of the engine 23 in the engine compartment 22, it is provided with a dry sump lubrication system. That is, the lubricant for the engine is not maintained in the crankcase chamber 43 as with typical engines, but rather is stored in a dry sump tank 108 that is mounted, in the illustrated embodiment, to the side of the engine 23 of the area left vacant by the canting of the engine. This dry sump tank 108 is mounted in the hull 12 separately from the engine 23. However, for a reason to be described, the tank 108 is mounted quite close to the engine.

Lubricant from the tank 108 is delivered through a conduit 111 to a high pressure pump 109 driven by the engine crankshaft 51. The high pressure pump 109 circulates the lubricant through the internal lubricating galleries of the engine which are not shown and which may take any known or conventional configuration.

After the engine has been lubricated, the lubricant will drain to the crankcase chamber 43 where it is picked up by a scavenge pump 112 and returned to the dry sump tank 108 through a return conduit 113. As a result of this arrangement, a relatively large amount of lubricant may be maintained in the tank 108 but the engine 22 may be mounted quite low because the crankcase 41 need not contain the total lubricant for the engine. Also, the positioning of the dry sump tank 108 on the side of the hull 12 behind the water trap device 101 helps balance the side-to-side weight of the watercraft.

It is important that the tank 108 be positioned close to the engine 23 so that the conduits 111 and 113 may be maintained relatively short. This is important because if the watercraft 11 is inverted, lubricant may flow between the tank and the engine and it is important that this lubricant can be returned immediately upon righting of the watercraft.

Although the illustrated embodiment positions the dry sump tank 108 to the side of the engine and on the side that the engine is canted away from, alternate tank locations are shown in phantom in FIGS. 1–3. A first alternate location $108_1$ positions the tank over the flywheel magneto assembly 96. An alternate location is behind the engine 23 and above the coupling 25 and this location is shown in phantom in FIGS. 1–3 as $108_2$.

It should be readily apparent from the foregoing description that the described watercraft provides a very compact assembly and a relatively low center of gravity through the use of a dry sump lubricating system. However, by positioning the lubricant tank quite close to the engine, it is possible to ensure that the flow of lubricant can be resumed immediately upon the righting of the watercraft after it has been capsized. In addition, the induction and exhaust systems are designed so as to ensure against intrusion of water into the engine through either the intake or exhaust systems in the event the watercraft becomes inverted. Of course, the foregoing description is that of the preferred embodiment of the invention and various changes and modifications may be made without departing from the spirit and scope of the invention, as defined by the appended claims.

We claim:

1. A watercraft having a hull, an engine compartment in said hull, a propulsion unit carried by said hull for propelling said watercraft through a body of water, a four-cycle, internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, said crankshaft rotating about a generally horizontal axis extending longitudinally in said hull a lubricating system for said engine comprising a lubricant tank fixed within said engine compartment in proximity to but spaced from said crankcase chamber and lubricant pump means for circulating lubricant from said lubricant tank to said engine and for returning lubricant from said engine to said lubricant tank, and transmission means for driving said propulsion unit from said crankshaft.

2. A watercraft as set forth in claim 1, wherein the lubricant tank is positioned in the engine compartment to the front of the engine.

3. A watercraft having a hull, an engine compartment in said hull, a propulsion unit carried by said hull for propelling said watercraft through a body of water, a four-cycle, internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, a lubricating system for said engine comprising a lubricant tank fixed within said engine compartment in proximity to but spaced from said crankcase chamber and lubricant pump means for circulating lubricant from said lubricant tank to said engine and for returning lubricant from said engine to said lubricant tank, transmission means for driving said propulsion unit from said crankshaft, and a flywheel magneto driven off the front of said crankshaft, said lubricant tank being disposed above said flywheel magneto.

4. A watercraft having a hull, an engine compartment in said hull, a propulsion unit carried by said hull for propelling said watercraft through a body of water, a four-cycle, internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, a lubricating system for said engine comprising a lubricant tank fixed within said engine compartment in proximity to but spaced from said crankcase chamber and lubricant pump means for circulating lubricant from said lubricant tank to said engine and for returning lubricant from said engine to said lubricant tank, and transmission means for driving said propulsion unit from said crankshaft, said lubricant tank being positioned to the rear of said engine.

5. A watercraft as set forth in claim 4, wherein the lubricant tank is positioned above the transmission means.

6. A watercraft having a hull, an engine compartment in said hull, a propulsion unit carried by said hull for propelling said watercraft through a body of water, a four-cycle, internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, a lubricating system for said engine comprising a lubricant tank fixed within said engine compartment in proximity to but spaced from said crankcase chamber and lubricant pump means for circulating lubricant from said lubricant tank to said engine and for returning lubricant from said engine to said lubricant tank, and transmission means for driving said propulsion unit from said crankshaft, said lubricant tank is disposed on a side of the engine.

7. A watercraft as set forth in claim 6, wherein the engine is disposed so that the cylinder block and cylinder bore are disposed at an acute angle to a vertically extending longitudinal center plane of the watercraft so as to place the cylinder block on one side of said vertical plane, the lubricant tank being positioned on the other side of the vertical plane.

8. A watercraft having a hull defining an engine compartment as set forth in claim 1, wherein the hull has an upper deck portion that tapers generally inwardly in an upward direction and wherein the cylinder head is disposed in the upwardly tapering portion of the hull.

9. A watercraft having a hull, an engine compartment in said hull, a propulsion unit carried by said hull for propelling said watercraft through a body of water, a four-cycle, internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, a lubricating system for said engine comprising a lubricant tank fixed within said engine compartment in proximity to but spaced from said crankcase chamber and lubricant pump means for circulating lubricant from said lubricant tank to said engine and for returning lubricant from said engine to said lubricant tank, and transmission means for driving said propulsion unit from said crankshaft, said hull having an upper deck portion that tapers generally inwardly in an upward direction, said cylinder head being disposed in the upwardly tapering portion of the hull, said upwardly tapering portion of said hull defining in part a passengers' area for the hull.

10. A watercraft having a hull defining an engine compartment as set forth in claim 9, wherein there is provided a seat at the upper extremity of the upwardly extending hull portion.

11. A watercraft having a hull defining an engine compartment as set forth in claim 10, wherein the seat affords a straddle-type seating arrangement for the watercraft occupant.

12. A watercraft as set forth in claim 11, wherein the lubricant tank is positioned in the engine compartment to the front of the engine.

13. A watercraft as set forth in claim 12, further including a flywheel magneto driven off the front of said the crankshaft, said lubricant tank being disposed above said flywheel magneto.

14. A watercraft as set forth in claim 11, wherein the lubricant tank is positioned to the rear of the engine.

15. A watercraft as set forth in claim 11, wherein the lubricant tank is positioned above the transmission means.

16. A watercraft as set forth in claim 11, wherein the lubricant tank is disposed on a side of the engine.

17. A watercraft as set forth in claim 16, wherein the engine is disposed so that the cylinder block and cylinder bore are disposed at an acute angle to a vertically extending longitudinal center plane of the watercraft so as to place the cylinder block on one side of said vertical plane, the lubricant tank being positioned on the other side of the vertical plane.

18. A watercraft as set forth in claim 1, wherein the engine is mounted within the engine compartment so that the cylinder block and cylinder bore are inclined at an acute angle to a vertically extending longitudinal plane passing through the center of the hull and further including an induction system for supplying a fuel air charge to the cylinder head and disposed on the side of the cylinder head facing the vertically extending plane and an exhaust system for discharging combustion products from said cylinder head disposed on the other side of said cylinder head.

19. A watercraft as set forth in claim 18, further including position responsive valve means for precluding the flow of water from one of said systems into the combustion chamber through the cylinder head.

20. A watercraft as set forth in claim 19, wherein there are position responsive valve means for precluding the flow to the combustion chamber from both of the systems.

21. A watercraft as set forth in claim 20, wherein the position responsive valve means are mounted at the respective cylinder head surfaces and are gravity operated for closing the respective communication with the combustion chamber upon the watercraft being capsized.

22. A watercraft as set forth in claim 18, wherein the induction system includes an air inlet device having a generally downwardly facing air inlet opening with a check valve therein for closing the induction system if the watercraft becomes inverted.

23. A watercraft as set forth in claim 19, wherein the air inlet device is disposed at one side of a cylindrical section that encircles an air outlet opening for delivering air to a charge former for centrifugally extracting water from the air charge delivered to the charge former.

24. A watercraft as set forth in claim 20, further including a drain at the bottom of the cylindrical portion of the air inlet device.

25. A watercraft as set forth in claim 18, wherein the air inlet device is disposed at one side of a cylindrical section that encircles an air outlet opening for delivering air to a charge former for centrifugally extracting water from the air charge delivered to the charge former.

26. A watercraft as set forth in claim 25, further including a drain at the bottom of the cylindrical portion of the air inlet device.

27. A watercraft having a hull, an engine compartment in said hull, a propulsion unit carried by said hull for propelling said watercraft through a body of water, a four cycle internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block in defining at least a crankcase chamber in which a crankshaft driven by said piston is journaled, an induction system formed on one side of said cylinder head for delivering a fuel air charge to said combustion chamber, an exhaust system formed on the other side of said cylinder head for exhausting burnt combustion products from said combustion chamber, position responsive valve means in at least one of said systems for precluding the flow of water into said combustion chamber through said system, and transmission means for driving said propulsion unit from said crankshaft.

28. A watercraft as set forth in claim 27, wherein there are position responsive valve means for precluding the flow to the combustion chamber in both of the systems.

29. A watercraft as set forth in claim 27, wherein the position responsive valve means are mounted at the respective cylinder head surfaces and are gravity operated for closing the respective communication with the combustion chamber upon the watercraft being capsized.

30. A watercraft having a hull, an engine compartment in said hull, a propulsion unit carried by said hull for propelling said watercraft through a body of water, a four cycle internal combustion engine positioned within said engine compartment and comprising a cylinder block having at least one cylinder bore receiving a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, an intake passage formed in said cylinder head on one side thereof and communicating with said combustion chamber, said intake passage being formed in part by an inlet opening, an air inlet device for collecting atmospheric air and delivering the air to said air inlet opening, said air inlet device comprising an outer housing having a discharge opening affixed in registry with said air inlet opening for delivering air thereto, an inlet opening in said outer housing for inducting atmospheric air from within said engine compartment, check valve means for closing said inlet opening when said hull becomes at least partially inverted for precluding water from entering said engine through said induction system, and transmission means for driving said propulsion unit from said crankshaft.

31. A watercraft as set forth in claim 30, wherein the air inlet device has a generally downwardly facing air inlet opening with the check valve means therein for closing the induction system if the watercraft becomes inverted.

32. A watercraft having a hull, an engine compartment in said hull, a propulsion unit carried by said hull for propelling said watercraft through a body of water, a four cycle internal combustion engine positioned within said engine compartment and comprising a cylinder block having at least one cylinder bore a piston, a cylinder head affixed to said cylinder block and defining with said cylinder bore and said piston a combustion chamber, a crankcase affixed to said cylinder block and defining at least in part a crankcase chamber in which a crankshaft driven by said piston is journaled, an intake passage formed in said cylinder head and extending from said combustion chamber to one said of said cylinder head and terminating in an air inlet opening, an air inlet device for collecting atmospheric air and delivering it to said air inlet opening, said air inlet device comprising an outer housing having a discharge opening affixed and registry to said air inlet opening for delivering air thereto, and inlet opening in said outer housing for inducting atmospheric air from within said hull, said outer housing having a generally cylindrical section surrounding said discharge opening and defined by an inner surface disposed substantially radially outwardly from discharge opening for defining a cylindrical area therearound, said inlet opening of said outer housing and said outer housing being configured for directing the air flow from said inlet opening to said discharge opening in a generally circular pattern for separating by centrifugal force water from the air inducted therein.

33. A watercraft as set forth in claim 32, further including a drain at the bottom of the cylindrical portion of the air inlet device.

\* \* \* \* \*